May 10, 1966 A. F. MANZ 3,250,894
METHOD AND APPARATUS FOR MONITORING SHORT CIRCUITS
IN ELECTRIC ARC WELDING
Filed March 22, 1963 2 Sheets-Sheet 1

INVENTOR.
AUGUST F. MANZ
BY
ATTORNEY

United States Patent Office 3,250,894
Patented May 10, 1966

3,250,894
METHOD AND APPARATUS FOR MONITORING SHORT CIRCUITS IN ELECTRIC ARC WELDING
August F. Manz, Newark, N.J., assignor to Union Carbide Corporation, a corporation of New York
Filed Mar. 22, 1963, Ser. No. 267,284
11 Claims. (Cl. 219—131)

This invention relates to consumable electrode electric arc welding and, more particularly, to method and apparatus for deriving a signal from short circuits which occur in such arc welding process.

In describing the inventive concept reference will be made to the consumable electrode welding process which is frequently referred to as the short-arc process. This process is characterized by a series of repetitive short circuits between the consumable wire and work wherein metal is transferred therebetween during such short circuits. Although reference will be made to short-arc welding, the inventive concept is not so limited. The invention can be used to monitor a short circuit in any welding process and the language of the appended claims should be so construed.

In order to obtain good welding conditions with the short-arc process the operator should be able to properly adjust the power source and wire feed speed to provide such conditions for the particular job. An experienced operator can subjectively determine a good welding condition. Other operators may or may not select the same condition with the result that inconsistent weld quality is obtained between welds made by the experienced operator and other operators. A system which would indicate when uniform short-arc conditions are achieved with different operators would have great utility since such a system would eliminate inconsistent welds.

In solving the above-mentioned problem, I have discovered a method of obtaining information from a short circuit period or other parameters related to duration of short circuit such as voltage or current and of utilizing such information to produce a signal which can indicate desirable weld conditions or to do any other useful job such as, for example, automatically cause a power supply and/or wire feed adjustment.

It is accordingly a main object of the invention to provide a method of deriving a signal from a short circuit period which can be utilized to do other useful work.

Another object is to provide a method for monitoring a short circuit period to indicate when such short circuit has a desired duration.

Yet another object is to provide a method for monitoring the short circuit duration in short-arc welding and using the information derived therefrom to indicate good welding conditions.

Still another object is to provide apparatus for indicating good short-arc welding conditions.

These and other objects will become apparent from the following description and drawings wherein.

In one aspect of the invention the objects are accomplished by monitoring the duration of a short circuit period and deriving information from the monitoring of the short circuit period and then utilizing the information to produce a signal.

An embodiment for achieving the aforementioned objects comprises a monitoring circuit which includes an arc connected in series relationship with a relay coil and means for preventing flow of current in the monitoring circuit until a fixed voltage across such means is exceeded; a reference circuit which includes a resistor and condenser connected in series with each other and with the relay coil in the monitoring circuit, the relay coil acting as the means by which the monitoring and reference circuits are compared, and a work circuit including the monitoring circuit relay contacts which operate to open and close the work circuit in response to the comparison of the monitoring and reference circuits.

Figure 1:
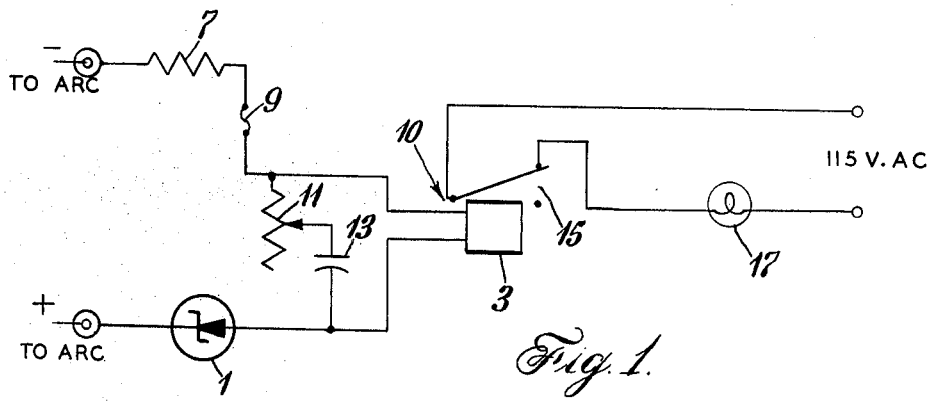
FIGURE 1 is a schematic diagram of a device incorporating the concept of the invention.

The inventive concept will be described in detail in discussing the device shown in FIG. 1. In this particular embodiment a monitoring circuit is provided by connecting a zener diode 1 in series with the coil 3 of a relay 10 and then connecting this arrangement across an arc. The zener diode is selected to prevent current flow in coil 3 due to any residual voltage across the short circuit. The zener diode should not permit current to flow at maximum short circuit voltage under any welding conditions but should permit current flow when there is any arc voltage. Also provided in this circuit is a resistor 7 and fuse 9. The resistor 7 provides means by which the voltage rating of the coil 3 may be adjusted to the arc voltage. The reference circuit is provided by connecting a variable resistor 11 in series with a condenser 13 and connecting this arrangement across the coil 3 in the monitoring circuit. The RC time constant of this circuit determines the size of resistor 11 and condenser 13. The RC time constant is determined by the welding circuit phenomena and is of the order of milliseconds. The time constant of RC network (resistor 11 and condenser 13) can be adjusted by variation in resistor 11 to prevent the relay 10 from dropping out as quickly as it would if the RC network were not present. Resistor 11 provides means for varying the reference against which the monitoring circuit is compared. If a short circuit condition at the arc persists longer than the RC network can maintain coil 3 in the pulled-in position, coil 3 will drop out relay 10, whereon contact 15 of relay 10 will operate. The RC time constant is preferably selected to maintain the relay 10 energized but on the verge of being de-energized when short circuit conditions are ideal. The coil 3 is the means by which the monitoring circuit is compared with the reference circuit. The contacts 15 associated with the coil 3 are in a work circuit which includes a lamp 17. When coil 3 is not energized relay 10 drops out and contacts 15 make the circuit and the lamp 17 is ON. The work circuit terminals are connected to a standard 115 volt A.C. source so that contacts 15 are the means by which the work circuit is opened and closed.

Figure 4:
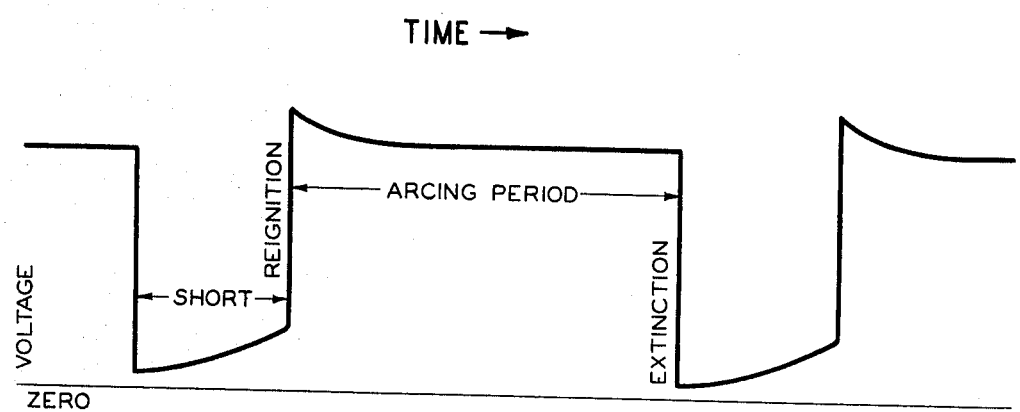
FIGURE 4 is an oscillograph of a typical short-arc voltage and current cycle.

The system just described, which is referred to as a short-arc stability indicator, is used to monitor the short circuit duration during the short-arc welding process. When the duration of a short circuit is of proper duration (see FIG. 4) a good welding condition exists. However, any deviation from the short circuit duration shown in FIG. 4 will adversely affect welding conditions. The particular device discussed here is designed to monitor the duration of the short circuit and compare the information obtained by the monitoring with a reference and thus provide a signal when the duration is too long. This signal is used to turn on an indicating lamp. Another version could be designed to provide a signal when duration is too small. Whatever version is designed, its operation should be based on determining the duration of the short circuit period or a factor, such as amplitude of current or amplitude of voltage, related to the duration of the short circuit period by electrical circuit time constants and then providing a signal for operation of some indicating device.

In operation, the indicator is set to indicate good short-arc welding conditions by adjusting the power source and/or electrode wire feed speed such that the indicating lamp 17 is caused to be ON. (The short circuit duration is too long.) The power source output is increased or the wire feed decreased until the lamp 17 is turned OFF, because contacts 15 are held in the energized position by the RC network. The power source output increase or the wire feed speed decrease shortens the short circuit duration to less than RC network time constant. A good short-arc welding condition is obtained when the light is OFF, but on the threshold of being turned ON. If the power source output is reduced or the wire feed speed is increased, the light will blink ON more frequently.

For very poor welding conditions due to too low a power source setting the light is ON continuously. The light will remain OFF if it is in the threshold of blinking ON-OFF, and the power source output is further increased. Therefore, if the light is OUT the power source output is lowered to put the light ON. If the light is ON, the power source output is raised to put it OFF. In each case the system is adjusted so that the light is at the ON-OFF threshold.

Figure 2:
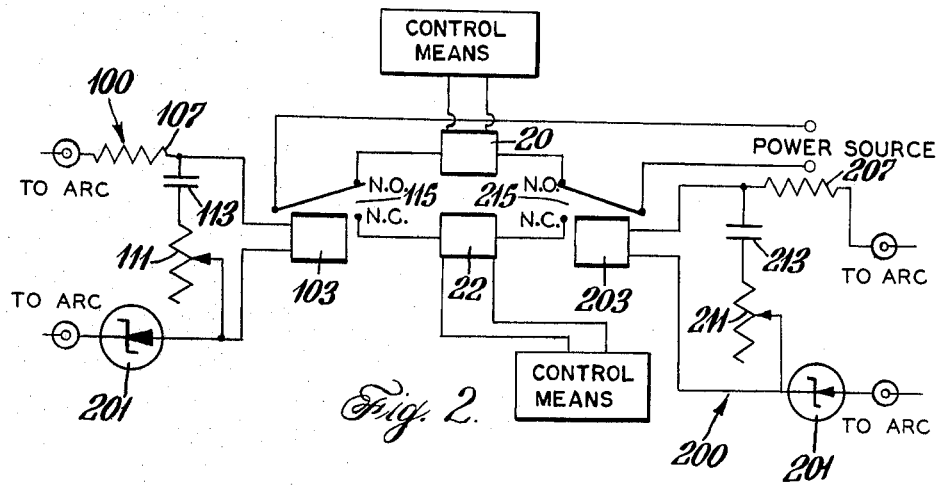
FIGURE 2 is a schematic diagram of another device utilizing the concept of the invention.

Another embodiment of the inventive concept is shown in FIG. 2. In this embodiment two identical circuits, 100 and 200, are substantially the same as the circuit shown in FIG. 1, so that like parts bear like reference characters differing from each other by units of 100. In this embodiment, contacts 115 and 215 of relays 103 and 203 are connected in circuit relation with relay coils 20 and 22; the contacts of which are located in some other circuit not shown. These other circuits could be circuits which cause power source or electrode wire feed adjustment, for example.

Figure 3:
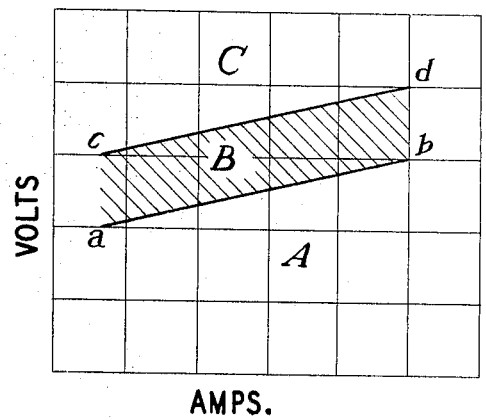
FIGURE 3 is a graphic illustration of how the device of FIG. 2 is utilized.

In operation, circuit 100 is adjusted by changing the RC time constant with a variation in resistor 111 to condition a–b (see FIG. 3) and circuit 200 is adjusted to condition c–d by varying resistor 211. The arc conditions (volts and amperes) are such that when the arc is in region A both coils 103 and 203 are de-energized. This is so because the voltage is not high enough to permit current flow through the zener diodes. In this case the contacts 115 and 215 of both relay 103 and relay 203 are in position N.O., completing the circuit to relay coil 20 which in turn operates to control, for example, the power source output and cause it to be raised. If the arc conditions are such that the arc is in region C, the contacts 115 and 215 will be in position N.C., closing the circuit to relay coil 22 which in turn operates to control the power source output and cause it to be lowered.

The raising or lowering action of the system will take place until the arc is in region B (above the line a–b and below the line b–c) which is the desirable arc welding region for short-arc.

Instead of increasing or decreasing the power source output, the circuit can be used to decrease or increase, respectively, the wire feed speed of the arc system.

While the invention has been described with reference to specific embodiments, it is to be understood that the concept may be applied in other embodiments without departing from the intended scope of this invention.

What is claimed is:

1. An electrical system for deriving a signal from a short circuit in consumable electrode arc welding which comprises a monitoring circuit including the arc and a relay coil connected in series with means for permitting current to flow through said monitoring circuit when there is any arc voltage while preventing the flow of current in said monitoring circuit when there is a short circuit, a reference circuit including a resistor and a condenser connected in series with said relay coil, such relay coil being connected in both the monitoring and reference circuit and acting as the means for comparing said monitoring circuit and said reference circuit and a control circuit including the contacts of said relay which operate to make or break said circuit in response to the comparison of said monitoring and reference circuits.

2. An electrical system for deriving a signal from a short circuit in consumable electrode arc welding which comprises at least two monitoring circuits each of such circuit including the same arc and a relay coil connected in series with means for permitting current to flow in said monitoring circuit when there is any arc voltage while preventing the flow of current in said monitoring circuit when there is a short circuit; at least two reference circuits, including a resistor and a condenser, one reference circuit and one monitoring circuit being electrically connected through the relay coil in said monitoring circuit and the other reference circuit being connected to the other monitoring circuit through the relay coil in said other monitoring circuit, the resistors in each of said reference circuits being adjusted to different values so as to produce different references; and a working circuit including the contacts of each of the relays in said monitoring circuits connected in series with at least two control relay coils such that the contacts of the relays in the monitoring circuits operate to open and close the working circuit.

3. An electrical system according to claim 1 wherein the means for preventing the flow of current in said monitoring circuit when there is a short circuit is a zener diode.

4. A method for deriving a signal from a short circuiting consumable electrode arc welding cycle which comprises permitting current to flow in a monitoring circuit when there is any arc voltage while preventing current from flowing in said monitoring circuit when there is a short circuit created by the physical contact of the consumable electrode with the work, thereby monitoring the short circuit cycle, deriving a signal from said monitored short circuit cycle, the magnitude of which varies as a function of the short circuit duration, providing a time based reference the magnitude of such reference being no greater than about the duration of said short-circuiting cycle, and comparing said derived signal with said reference to produce an output signal.

5. A method for deriving a signal from a short circuiting consumable electrode arc welding cycle which comprises permitting current to flow in a monitoring circuit when there is any arc voltage while preventing current from flowing in said monitoring circuit when there is a short circuit created by the physical contact of the consumable electrode with the work, thereby monitoring the short circuit cycle, deriving a signal from said monitored short circuiting cycle, the magnitude of which varies as a function of the short-circuit duration, providing a time based reference the magnitude of such reference being no greater than about the duration of said short circuiting cycle, and comparing said derived signal with said reference to produce an output signal, using said output signal to operate indicating means.

6. A method for deriving a signal from a short circuiting consumable electrode arc welding cycle which comprises permitting current to flow in a monitoring circuit when there is any arc voltage while preventing current from flowing in said monitoring circuit when there is a short circuit created by the physical contact of the consumable electrode with the work, thereby monitoring the short circuit cycle, deriving a signal from said monitored short circuiting cycle, the magnitude of which varies as a function of the short-circuit duration, providing a time based reference the magnitude of such reference being no greater than about the duration of said short circuiting cycle, and comparing said derived signal with said reference to produce an output signal, using said output signal to operate a control means.

7. A method for deriving an output signal from a short circuit in a short circuiting consumable electrode arc welding cycle which comprises permitting current to flow in a monitoring circuit when there is any arc voltage while preventing current from flowing in said monitoring circuit when there is a short circuit created by the physical contact of the consumable electrode with the work thereby monitoring the short circuit, deriving a signal from said monitored short circuit, the magnitude of which varies as a function of the short-circuit duration, providing a time based reference the magnitude of such reference being no greater than the duration of one short circuiting cycle comparing said derived signal with said reference, producing said output signal from said comparison and utilizing said output signal to operate means for indicating when preselected welding conditions are being maintained.

8. A method for deriving a work signal from a short circuit in a short circuiting consumable electrode arc welding cycle which comprises permitting current to flow in at least one monitoring circuit when there is any arc voltage while preventing current from flowing in said monitoring circuit when there is a short circuit created by the physical contact of the consumable electrode with the work thereby monitoring the short circuit, deriving a signal from said monitoring short circuit, the magnitude of which varies as a function of the short-circuit duration, providing at least two different time based references the magnitude of such references being no greater than the duration of one short circuiting cycle, comparing said signal respectively with said different references and producing separate output signals from each of said comparisons and then combining said output signals to produce said working signal.

9. A method for deriving a working signal from a short circuit in a short circuiting consumable electrode arc welding cycle wherein the consumable electrode is fed from a source to an arc and the metal transfer from said consumable electrode is during a series of repetitive short circuits between the consumable electrode and the workpiece which comprises permitting current to flow in at least one monitoring circuit when there is any arc voltage while preventing current from flowing in said monitoring circuit when there is a short circuit created by the physical contact of the consumable electrode with the work thereby monitoring the short circuit, deriving a signal from said monitored short circuit, the magnitude of which varies as a function of the short-circuit duration, providing at least two different time based references the magnitude of such references being no greater than the duration of one short circuiting cycle, comparing said signal respectively with said different reference, producing separate output signals from each of said comparisons then combining the output signals to produce said working signal which is utilized to activate a control means adapted to control said consumable electrode feed to maintain a desired welding condition.

10. A method for deriving a working signal from a short circuit in a short circuiting consumable electrode arc welding cycle wherein the consumable electrode is fed from a source to an arc and the metal transfer from said consumable electrode is during a series of repetitive short circuits between the consumable electrode and the workpiece which comprises permitting current to flow in at least one monitoring circuit when there is any arc voltage while preventing current from flowing in said monitoring circuit when there is a short circuit created by the physical contact of the consumable electrode with the work thereby monitoring the short circuit, deriving a signal from said monitored short circuit, the magnitude of which varies as a function of the short-circuit duration, providing at least two different time based references the magnitude of such references being no greater than the duration of one short circuiting cycle, comparing said signal respectively with said different reference, producing separate output signals from each of said comparisons then combining the output signals to produce said working signal which is utilized to activate a control means adapted to control power supply adjustments.

11. A system for deriving a signal from a short circuiting consumable electrode arc welding cycle which comprises means for monitoring said short circuiting cycle, such means including means for permitting current to flow therethrough when there is any arc voltage while preventing current from flowing therethrough when there is a short circuit, to thereby produce a signal the magnitude of which varies as a function of the short-circuit arc duration, means for producing a time based reference the magnitude of such reference being no greater than about the duration of said short circuiting cycle, and means for comparing the monitored short circuit with the reference to produce a signal from such comparison.

References Cited by the Examiner
UNITED STATES PATENTS

| | | | |
|---|---|---|---|
| 2,027,224 | 1/1936 | David | 219—135 |
| 3,097,252 | 7/1963 | Robinson | 13—13 |
| 3,143,587 | 8/1964 | Buehl | 13—13 |

RICHARD M. WOOD, *Primary Examiner.*

JOSEPH V. TRUHE, ANTHONY BARTIS, *Examiners.*